Dec. 6, 1960 R. A. WALLACE 2,962,920
CUT-OFF MEANS FOR PIPE-CUTTING AND THREADING MACHINE
Original Filed Feb. 24, 1950 2 Sheets-Sheet 1

INVENTOR.
Richard A. Wallace
BY
ATTORNEY

Dec. 6, 1960   R. A. WALLACE   2,962,920
CUT-OFF MEANS FOR PIPE-CUTTING AND THREADING MACHINE
Original Filed Feb. 24, 1950   2 Sheets-Sheet 2
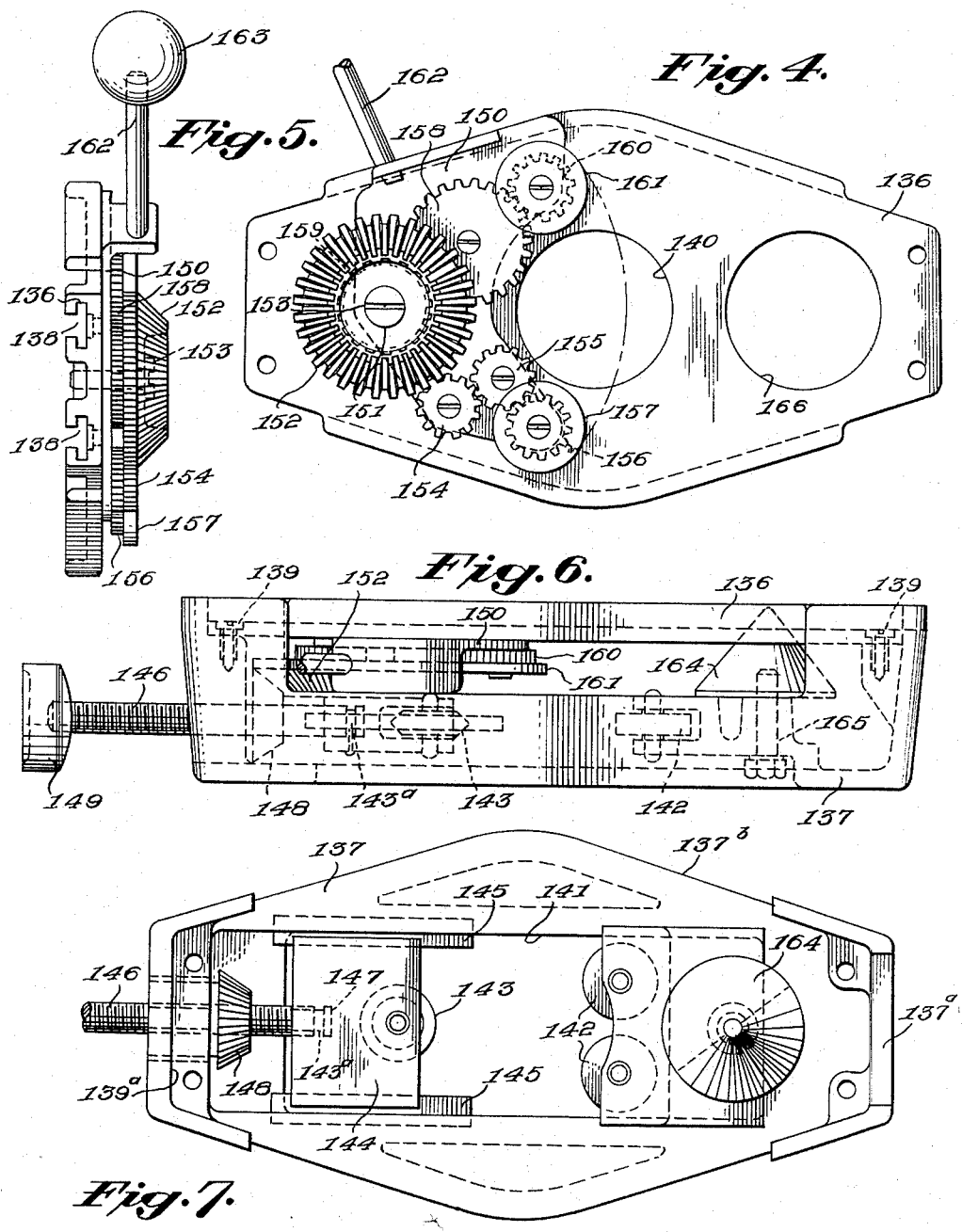
INVENTOR.
Richard A. Wallace
BY
ATTORNEY

United States Patent Office 2,962,920
Patented Dec. 6, 1960

2,962,920

CUT-OFF MEANS FOR PIPE-CUTTING AND THREADING MACHINE

Richard A. Wallace, 2750 Audubon Road,
Port Kennedy, Pa.

Original application Feb. 24, 1950, Ser. No. 145,974, now Patent No. 2,692,996, dated Nov. 2, 1954. Divided and this application Apr. 5, 1956, Ser. No. 576,296

6 Claims. (Cl. 82—92)

This invention relates to an improved cut-off assembly for use on pipe threading, cutting and reaming machines.

More particularly, this invention is concerned with a cutting assembly mounted on a movable carriage of a portable pipe threading, cutting and reaming machine.

This application is a division of my previously filed co-pending application, Serial No. 145,974 entitled "Pipe-Cutting and Threading Machine," filed February 24, 1950, which is now U.S. Patent No. 2,692,996, entitled "Lubrication Means for Pipe-Cutting and Threading Machines," issued November 2, 1954.

One of the objects of this invention is to provide a cutting-off mechanism which is power driven through friction means from the rotating pipe, being slidably attached to the threading mechanism mounted on the carriage for instant alignment with different size pipe, and having the cut-off tool driven into and away from the pipe by a single operating handle, thus relieving the operator of muscular effort to move the cut-off tool into and away from the pipe.

Other objects and advantages of the invention will become apparent in the course of the following detailed description, taken in connection with the accompanying drawings, wherein:

Fig. 4 is a side elevational view of the base portion of the cut-off frame assembly with a gear assembly operatively supported thereby;

Fig. 5 is an elevational view as observed from the left end of Fig. 4;

Fig. 6 is a top plan view of the cut-off assembly; and

Fig. 7 is a side elevational view of the major portion of the cut-off frame assembly which cooperates with the base portion shown in Fig. 4.

Figure 1:
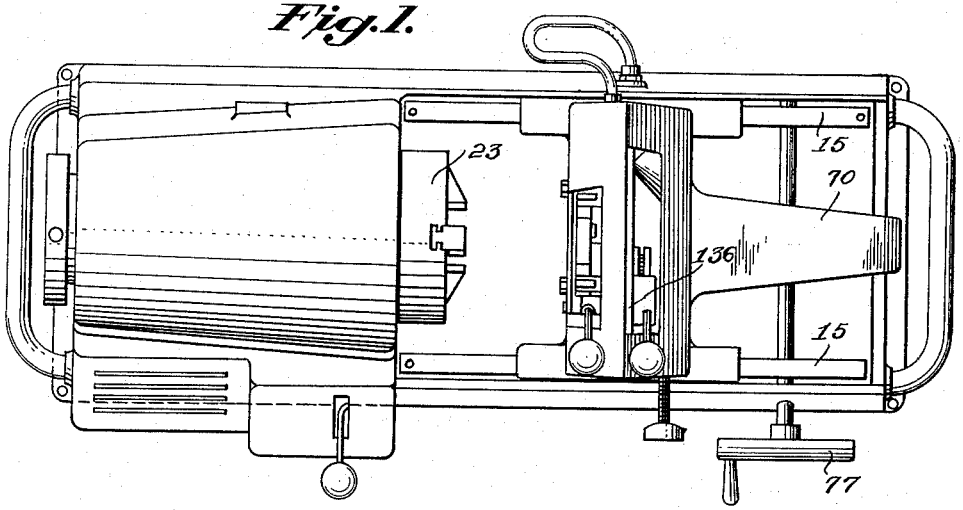
Fig. 1 is a top plan view of the cut-off assembly mounted on the moveable carriage of a threading machine.
Figure 2:
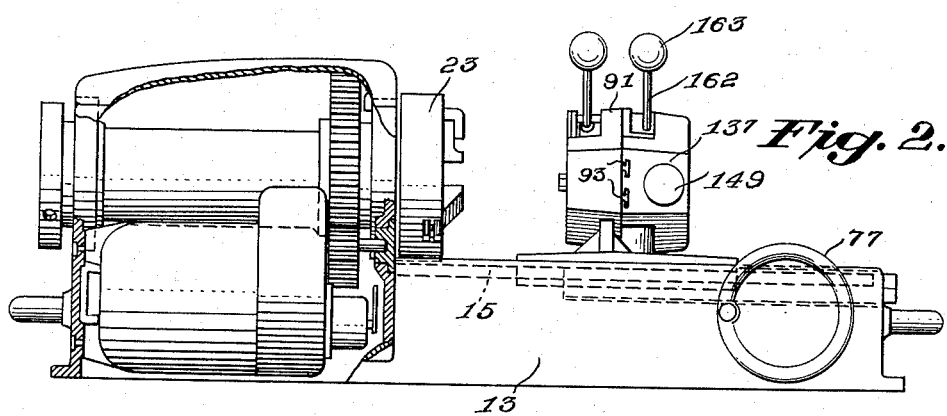
Fig. 2 is a side elevational view of the cut-off assembly mounted on the machine.

Referring now in detail to the drawings, a carriage 70 which is slidably disposed on the tracks 15 of the frame portion of a threading machine as shown in Figs. 1 and 2 is adapted for support of a threading mechanism which is the subject of my co-pending application Serial No. 465,861 entitled "Threading Means for Pipe-Cutting and Threading Machines," and a cut-off mechanism which is the subject of this invention.

The cut-off assembly (Figs. 4–7) comprises an elongated frame including a base plate 136 and a housing portion 137.

The base plate 136 is provided with guideways 138 which receive the ribs 93 on the diehead base plate 91 whereby the cut-off assembly is supported on the diehead frame assembly for movement longitudinally thereof or transverse to the longitudinal axis of the main frame portion 13.

The housing portion 137 is provided with a cut-out 137a on its rearward end to allow insertion upon and removal from the diehead base plate ribs 93 of the cut-off assembly. The housing portion 137 is likewise provided with an abutment 139a on its forward end to prevent transverse sliding of the cut-off assembly when in the raised position for screwing a fitting onto a pipe. The housing portion is further provided with a cut-out 137b along its top for visibility of the cutter wheel, and with a bottom cut-out 137c along its bottom for chip disposal.

The housing portion 137 receives and is secured to the base portion by means of screws 139. The base plate 136 is provided with a work receiving opening 140 normally axially aligned with an opening in the diehead assembly and housing portion 137 is provided with a rectangular opening 141 a portion of which is opposed to the opening 140.

The portion 137 is provided with a pair of work engageable rollers 142 at one end of the rectangular opening 141. A disc cutter 143 is rotatably supported by a block 144 which is slidably supported on tracks 145 supported by housing portion 137 adjacent the opposite end of opening 141.

The work is adapted to normally engage the rollers 142 and the cutter disc 143 is adapted to be brought into cutting action with the work which action is in accordance with the present invention effected by the rotating work.

An elongated screw 146 is threadedly engaged in a bevelled pinion 148 rotatably supported by the housing portion 137. One end of the screw is swivelly connected to the block by the pin 143a as indicated at 147 in Fig. 7, while the other end is engaged with a hand operable knob 149. The knob 149 is used for several functions; by turning, to manually operate the screw and gear train, by pulling, to cause the cut-off assembly to slide relative to the diehead assembly, and by lifting, to raise the diehead and the cut-off assembly from its position on the carriage. This knob is shaped with a curved rear surface for comfort in pulling and raising.

The improved means for effecting movement of the block 144 and cutter disc 143 by rotation of the work comprises the following cooperating elements. A plate 150 is rotatably supported on the base plate 136 as indicated at 151. A relatively large bevel gear 152 is rotatably supported on the plate 150 coaxially of its pivotal mounting and preferably by means of the same bolt 153 which pivotally connects the plate 150 to the base plate 136 and the bevel gear 152 is constantly in mesh with the bevelled pinion 148.

The bevel gear 152 is adapted to be rotated by the rotating work for effecting movement of the cutter disc into cutting engagement with the work and also for moving the cutting disc away from the work after its cutting operation. Accordingly, two gear trains are provided on the plate 150, a lower one for movement of the cutter disc toward the work and an upper one for moving the cutter disc away from the work.

The lower gear train is constructed to provide a large ratio between the speed of the cutter disc and the surface speed of the pipe to provide ample torque to cut off the pipe, while the upper train has a small gear ratio to allow backing the cutter disc from the pipe at high speed.

The lower gear train comprises a gear 154 in meshing engagement with peripheral teeth on the gear 152, a gear 155 in meshing engagement with the gear 154 and a gear 156 on the inner side of a work engageable roller 157. The upper gear train comprises a gear 158 in meshing engagement with a gear 159 on the inner face of gear 152 and a gear 160 on the inner face of a work engageable roller 161.

The gears and rollers are all pivotally supported on the plate 150 and the plate is provided with an operating knob 163 on the outer free end thereof. The rollers 157 and 161 have hardened, knurled surfaces for obtaining a good friction grip on the pipe.

The dot-and-dash line in Fig. 4 indicates the arcuate movement of the plate 152 as effected by the handle 162.

Upon movement of the handle to the left (Fig. 4) or towards the operator as viewed in Fig. 2, the roller 157 will be brought into engagement with the rotating work and through the successive gears 156, 155, 154, 152 and pinion 148 and screw 146, the block 144 will be moved toward the work and accordingly the cutter disc will be brought into slow speed cutting engagement with the work. At this time the cut-off assembly will slide on the guide ways 138 so that the rollers 142 bear against the pipe.

Upon movement of the handle 162 to the right, or away from the operator the roller 161 will be brought into engagement with the rotating work and the block 144 together with the cutter disc 143 will be moved away from the work at high speed through the gears 160, 158, 159, 152, pinion 148 and screw 146.

The housing portion 137 is preferably provided with a conical reamer 164 which is held rigid therewith as by means of a bolt 165. The base plate 136 is provided with a circular work receiving opening 166 opposite the reamer 164 and such opening may be brought into alignment with the work subsequent to the cutting-off operation by pulling on the knob 149 which will cause movement of the cut-off and reaming assembly relative to the diehead assembly as is afforded by the interengaging ribs 93 and the guide ways 138. This position is shown in dotted lines in Fig. 3.

Having described in detail the mechanical construction of the novel cut-off mechanism, the operation thereof may be briefly stated as follows:

A pipe to be cut off is introduced into the chuck assembly and gripped as described in detail in my U.S. Patent No. 2,591,389.

The carriage 70 is moved by the hand wheel 77, pinion and rack 74 to a position wherein the cut-off disc 143 is at the desired cutting-off position, preferably substantially midway between the end of the carriage guide tracks.

The handle 162 is then pulled down, or towards the operator, whereupon the roller 157 will engage the rotating pipe and through the associated gear train the cutting disc 143 will be moved into cutting engagement with the rotating pipe.

The cutting-off operation will require about six seconds on a 2" pipe. After the pipe has thus been cut off the handle 162 is moved upwardly, whereupon the roller 161 will engage the rotating pipe and through the associated gear train, the cutting disc 143 will be moved away from the pipe at relatively high speed.

After the cutting-off operation, the pipe end is ready for threading in the manner described in detail in my application, Serial No. 465,281, now Patent No. 2,816,300.

After the threading operation, the pipe end is ready for reaming. The housing 137 is moved toward the operator by grasping the knob 149 whereupon the reaming assembly slides along the threading assembly by means of the interengaging ribs 93 and the guideways 138.

The reamer is axially aligned with the pipe and is brought into operative contact therewith by movement of the carriage 70 toward the left whereupon the end of the pipe will be subjected to a reaming operation.

Figure 3:
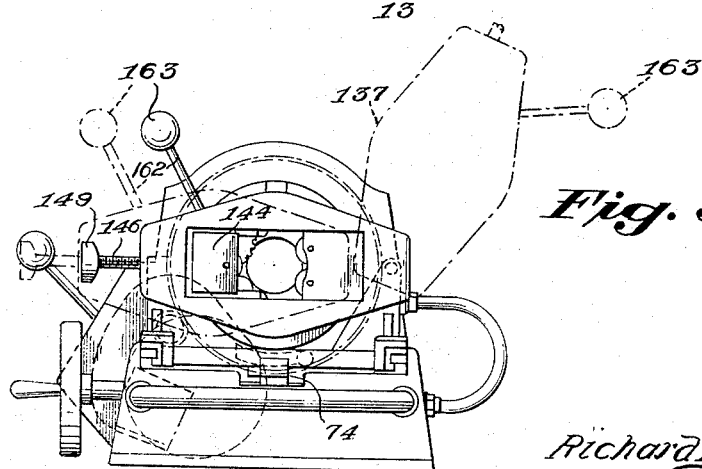
Fig. 3 is an end elevation as observed from the right end of Figs. 1 and 2 wherein the cut-off assembly is shown in solid lines in its cutting position, and in dotted lines in its make-up positions.

If desired, the making up of a fitting may be done next by moving the carriage 70 away from the housing 23 far enough for a threading chaser, to clear the end of the pipe, whereupon the two assemblies are jointly raised through a pivotal connection with the carriage as in Fig. 3, and which raising is easily effected by lifting upwardly on knob 149. The pipe fitting may be held by hand until tight. The machine may then be stopped and the fitting tightened by a wrench.

From the above detailed disclosure of the present invention it will be observed that a novel cut-off assembly is provided which is capable of cutting off pipe or tubes with accuracy, in a brief period of time, with minimum attention and exertion on the part of the operator.

While I have disclosed my invention in accordance with a single specific structural embodiment thereof, such is to be considered as illustrative only, and not restrictive, the scope of the invention being defined in the sub-joined claims.

What I claim and desire to secure by U.S. Letters Patent is:

1. A cut-off assembly comprising a box-like frame including a side wall having a circular pipe admission opening therein, a block slidably supported by the frame for movement normal to the axis of said opening, a pipe cutting disc rotatably supported by said block, and manually operable means having a constant driving connection with said block and being selectively frictionally engageable with a rotated pipe below and above the center of said opening for moving the cutting disc into and out of operative engagement with the pipe.

2. The structure according to claim 1 wherein said manually operable means comprises a screw, swivelly connected with said block, a rotatable bevelled pinion threadedly engaged with said screw, a plate pivotally supported by said side wall, a bevelled gear rotatably supported by said plate concentric with its pivotal connection and in constant mesh with said pinion and two trains of gears in operative engagement with said bevelled gear and each including a roller selectively frictionally engageable with the rotating pipe below and above the center of said opening upon swinging said plate.

3. The structure according to claim 1 together with a pair of rollers supported by said frame in opposition to said cutting disc.

4. The structure according to claim 2 wherein one of said trains of gears drives the cutter disc into a pipe while the other train of gears removes the cutter disc from the pipe, and the said first train of gears having a higher gear ratio than the second train of gears.

5. A pipe cut-off assembly, comprising an elongated frame including a base plate and a housing to one side of which said base plate is secured, said base plate being provided with a pipe receiving opening, said housing having a rectangular opening intermediate the ends thereof for extension of a pipe therethrough, a pair of fixed work engageable rollers at one side of said rectangular opening, a pipe cutting disc adjustably disposed at the opposite side of said rectangular opening, and manually operable means supported by said base plate including rollers engageable with the pipe when in rotation for moving the cutting disc into and out of engagement with the pipe.

6. The structure according to claim 5 wherein said manually operable means comprises a block slidably mounted in said housing and on which said cutting disc is rotatably mounted, a screw having one end thereof swivelly engaged with said block, a pinion threadedly engaged with said screw, a plate pivotally supported on said base plate, a gear rotatably disposed on said base plate concentric with the pivotal support thereof, and being in mesh with said pinion, and gears supported by said plate in driving engagement with said rollers and said first gear and the gears being so disposed that upon movement of the plate in one direction the said cutting disc will be moved toward the pipe and upon movement in an opposite direction the cutting disc will be moved away from the pipe.

(References on following page)

References Cited in the file of this patent

UNITED STATES PATENTS

| | | |
|---|---|---|
| 490,427 | Childs | Jan. 24, 1893 |
| 2,084,396 | Hennessy | June 22, 1937 |
| 2,156,581 | Campbell | May 2, 1939 |
| 2,410,355 | Nesbitt et al. | Oct. 29, 1946 |
| 2,547,195 | Caliendo | Apr. 3, 1951 |
| 2,569,566 | Hoffman | Oct. 2, 1951 |
| 2,637,227 | McIntosh | May 5, 1953 |
| 2,642,137 | Vosper | June 16, 1953 |
| 2,768,550 | Ingwer et al. | Oct. 30, 1956 |